Figure 1:
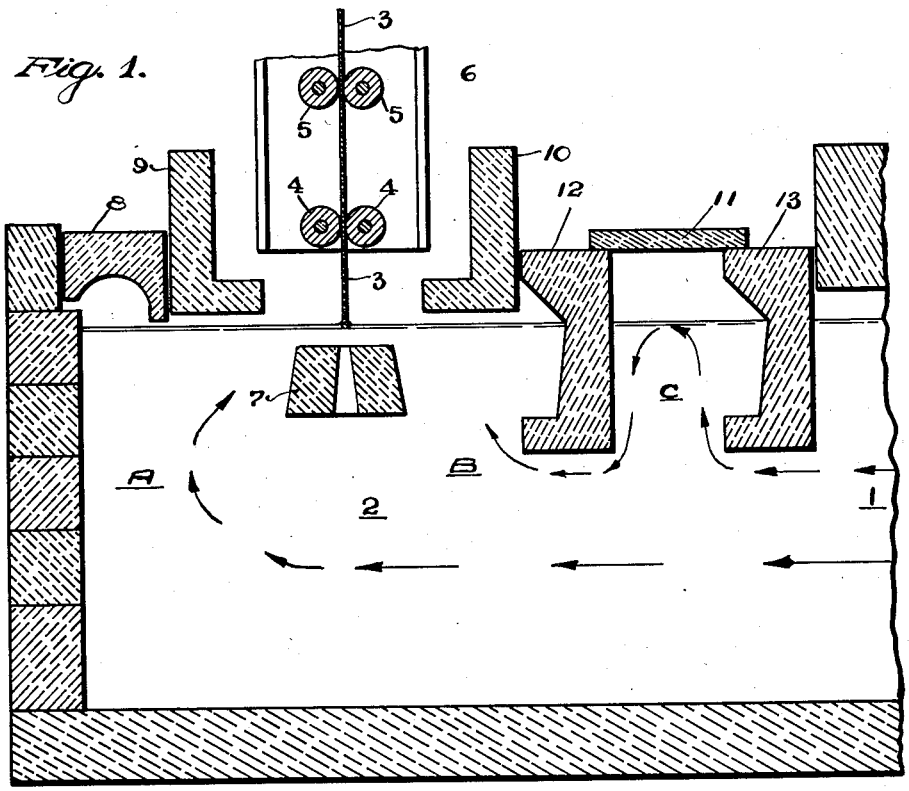

Nov. 20, 1934.          H. L. HALBACH          1,980,992
GLASS DRAWING TANK
Filed May 22, 1933

INVENTOR
HOWARD L. HALBACH.
BY Bradley & Bee
ATTORNEYS

Patented Nov. 20, 1934

1,980,992

UNITED STATES PATENT OFFICE 1,980,992

GLASS DRAWING TANK

Howard L. Halbach, Clarksburg, W. Va., assignor to Pittsburgh Plate Glass Company, a corporation of Pennsylvania Application May 22, 1933, Serial No. 672,247

2 Claims. (Cl. 49—17)

Figure 2:
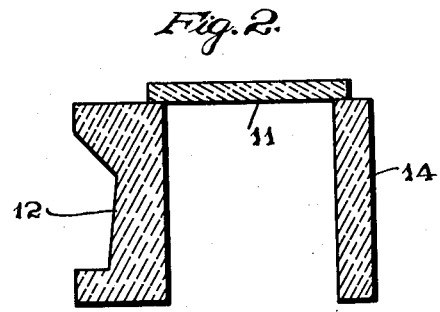

The invention relates to a glass drawing tank from which sheet glass is to be drawn, and relates particularly to the clay work used in the glass bath from which the sheet is drawn. The invention involves an improvement over the construction shown in my Patent No. 1,920,692, issued August 1, 1933. The invention has for its principal objects the provision of a construction which insures the delivery of glass to the two sides of the sheet being drawn which is more uniform in temperature than in the construction of my prior application above identified, and in which the sheet drawing operation continues to remain normal over a wider range of melting tank temperatures and pressures. Briefly stated, this result is accomplished by using two cut-off plates or skim bars intermediate the line of draw and the melting tank instead of only a single bar and in extending these bars down into the glass bath to a substantially greater depth than has heretofore been the practice. This gives a more complete cut-off between the drawing end of the tank and the melting tank than has heretofore been the case, and provides a circulation and cooling chamber intermediate the drawing end of the tank and the melting tank, so that cooler and more homogeneous glass is delivered to the drawing end of the tank with the further result that the body of glass forward of the vertical center line of the draw bar closely approximates that of the body of glass to the rear of such center line. The net result is more uniform drawing conditions with substantially less tendency toward warping in the sheet produced and consequently less breakage. Certain embodiments of the invention are illustrated in the accompanying drawing, wherein:

Figure 1 is a vertical section through the apparatus. And Fig. 2 is a partial section showing a modification.

Referring to Fig. 1, the reference numeral 1 indicates the melting tank, which may be of any approved type, and 2 is a drawing extension which communicates at its left hand end with the melting tank. The glass sheet 3 is drawn continuously from the body of molten glass in the extension 2 by means of pairs of rollers 4, 4, 5, 5, etc. which carry the glass upward in a continuous ribbon or sheet through the leer casing 6, at the top of which casing, the glass is cut into sections in the usual way. A draw bar 7 of refractory material lies in the body of glass in the extension and performs the usual functions of maintaining the position of the line of draw and of giving a cooler layer of glass from which to draw the sheet than would be the case if the draw bar were not employed. The cover of the extension comprises the refractory members 8, 9, 10 and 11 and the upper ends of the skim bars 12 and 13.

The skim bars preferably extend down into the glass bath about 23 inches, so that their lower edges lie well below the level of the bottom of the draw bar, and are spaced apart a substantial distance to provide a cooling and circulation chamber C therebetween. This construction results in the delivery of a hotter body of glass to section A of the extension lying to the left of the vertical center line of the draw bar than has been the case in extensions heretofore used employing the usual type of skim bar, or one similar to that of my patent above referred to, so that the temperatures in the two sections A and B are very nearly the same. This is a desirable condition of operation, as variations in the temperature of glass supplied to the two sides of the sheet tends to cause warping and breakage. The result secured is due in part, I believe, to the cooling and circulation chamber C, which tends to deliver glass of a lower temperature to section B than if such chamber were not employed, and in part due to the extension of the skim bars to a lower level in the glass bath than has heretofore been done, so that a flow occurs to section A at a lower level than formerly, resulting in hotter glass being delivered to section A. The temperature conditions on the two sides of the draw bar are thus more evenly balanced than in former constructions, wherein the glass on the side of the bar remote from the tank was considerably cooler than on the side next to the tank, unless additional heat were supplied to the cooler side by means of gas burners. The use of the double cut-off has the further advantage that it makes it possible to operate the melting end of the tank with a more efficient flame, as a hotter, sharper regenerator flame can be used at the ports nearest the drawing extension without adversely affecting the drawing operation, which result occurs when too much heat is applied near the extension employing the ordinary form of cut-off. Further, the drawing operation continues normal over a wider range of tank temperatures and pressures.

In all cases, it is desirable to provide the skim bar 12 with the horizontal foot or flange at its lower end, as shown, for the reasons set forth in my pending application, but the other bar 13 may be used with good results if made without the foot or flange, as indicated in Fig. 4, in which the bar 15 is shown as rectangular in cross section. The dimensions of the skim bars and their spacing may be varied to a considerable extent depending upon the proportions of the drawing extension.

What I claim is:

1. In combination in apparatus for making sheet glass including a melting tank and a drawing extension communicating therewith, means for drawing a glass sheet from the extension, a draw bar of refractory material in the glass bath beneath the line of draw, a skim bar of refractory material in the glass bath between the draw bar and the inlet end of the drawing extension and remote from said draw bar, and a second skim bar of refractory material in the glass bath between the first skim bar and the inlet end of the extension, both of said skim bars having their lower edges at a level substantially below that of the bottom of the draw bar.

2. In combination in apparatus for making sheet glass including a melting tank and a drawing extension communicating therewith, means for drawing a glass sheet from the extension, a draw bar of refractory material in the glass bath beneath the line of draw, a skim bar of refractory material in the glass bath between the draw bar and the inlet end of the drawing extension and remote from said draw bar, and a second skim bar of refractory material in the glass bath between the first skim bar and the inlet end of the extension with its lower edge not substantially above the level of the bottom of the draw bar, the first mentioned skim bar having its lower edge at a level substantially below that of the bottom of the draw bar.

HOWARD L. HALBACH.